No. 805,064. PATENTED NOV. 21, 1905.
H. K. HITCHCOCK.
MANUFACTURE OF SHEET GLASS.
APPLICATION FILED AUG. 14, 1901.
4 SHEETS—SHEET 2.
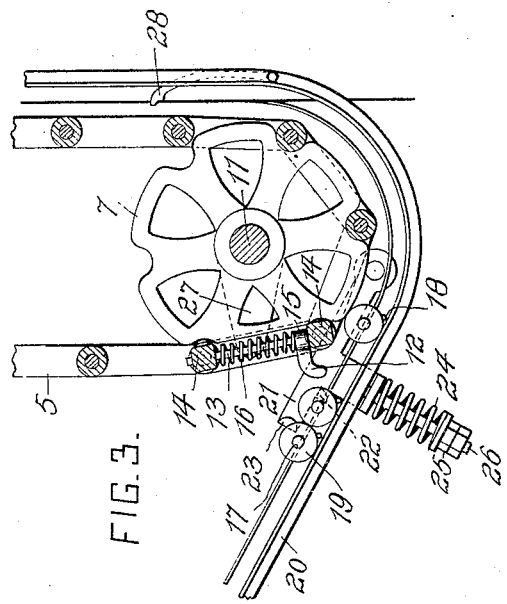
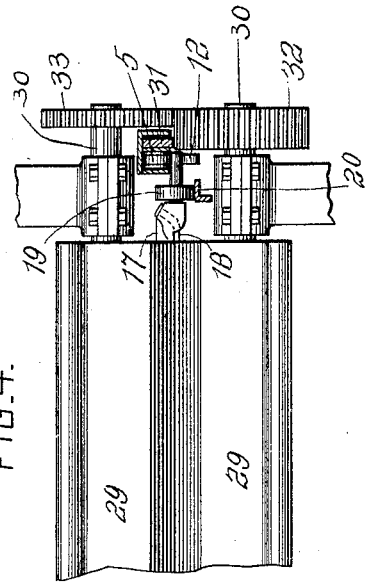
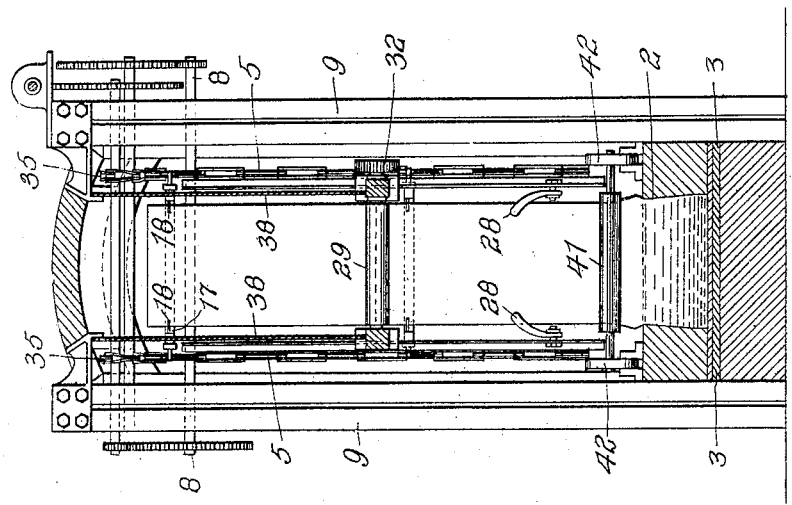
WITNESSES:
Herbert Bradley.
F. M. Dapper.
INVENTOR
Halbert K. Hitchcock
by Damon S. Wolcott Att'y.

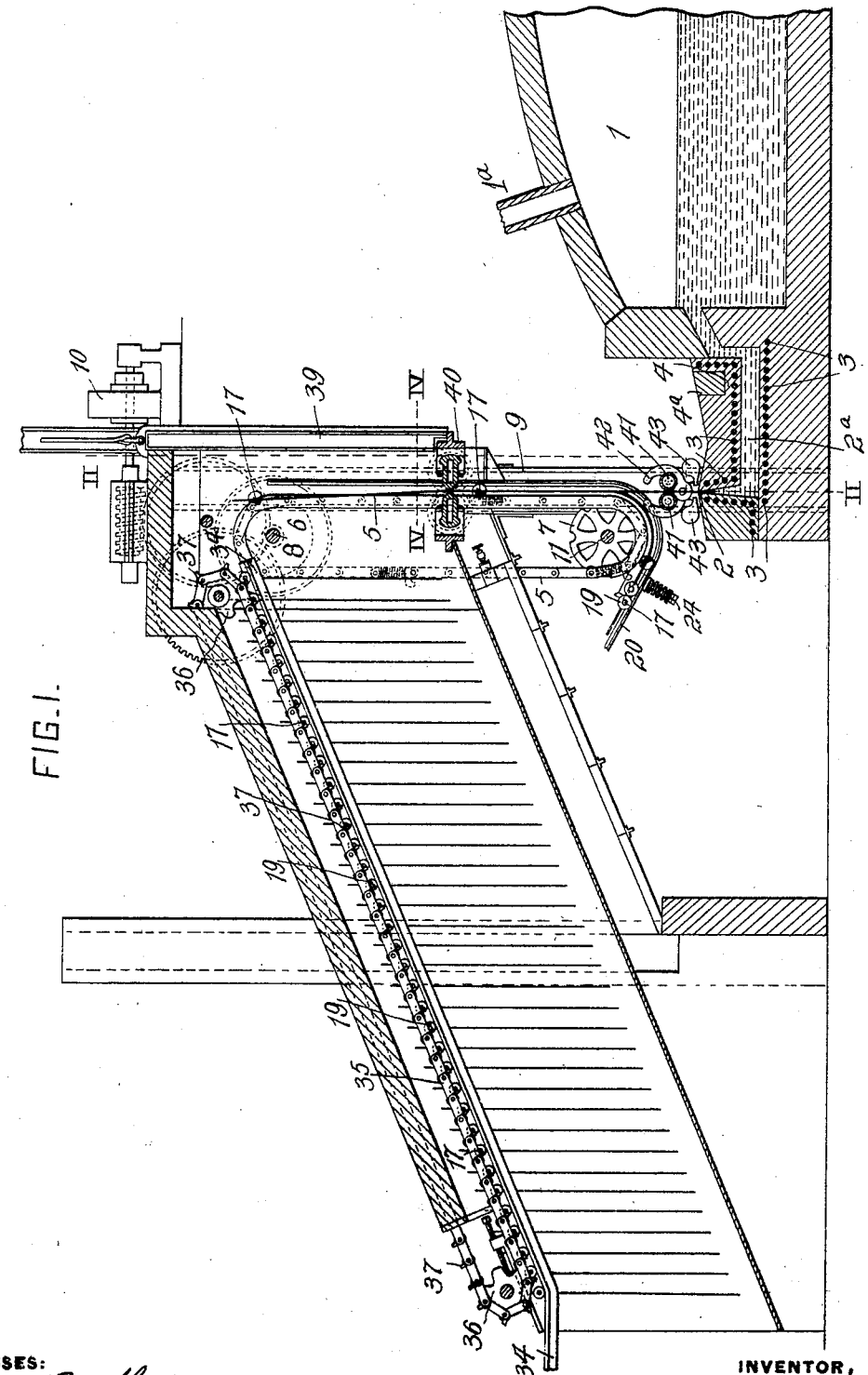

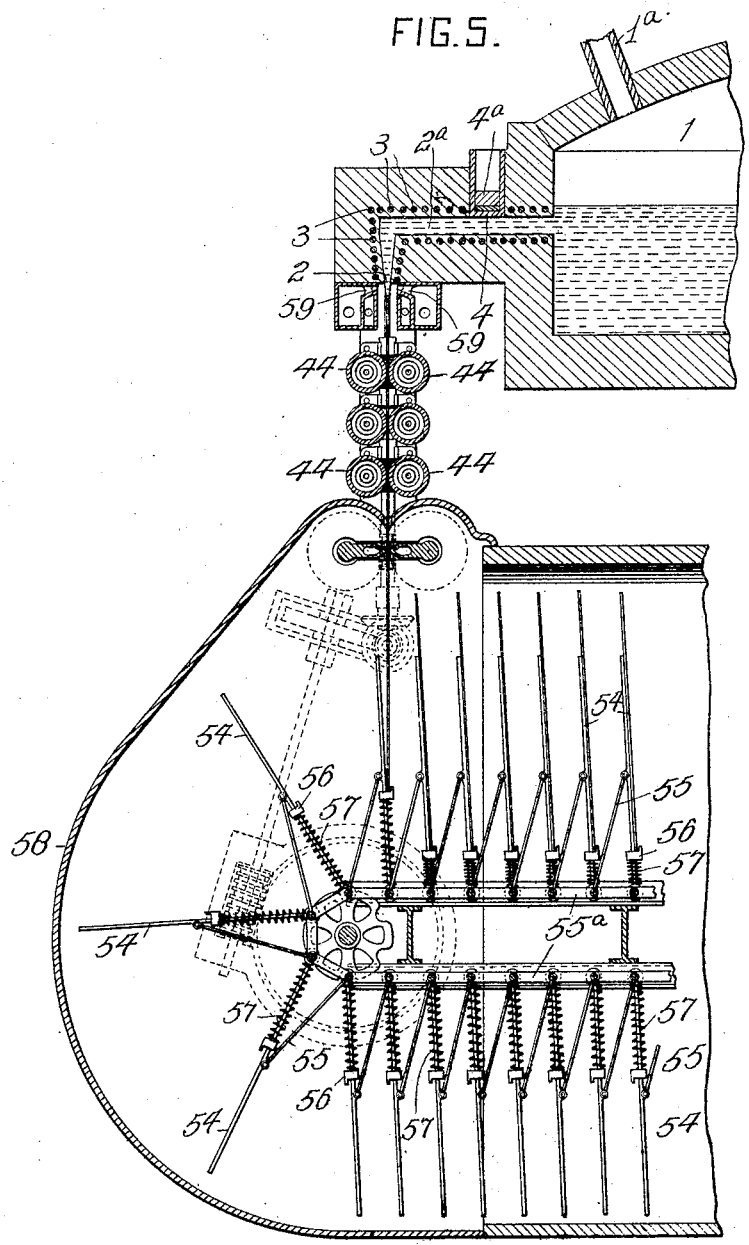

No. 805,064. PATENTED NOV. 21, 1905.
H. K. HITCHCOCK.
MANUFACTURE OF SHEET GLASS.
APPLICATION FILED AUG. 14, 1901.
4 SHEETS—SHEET 4.
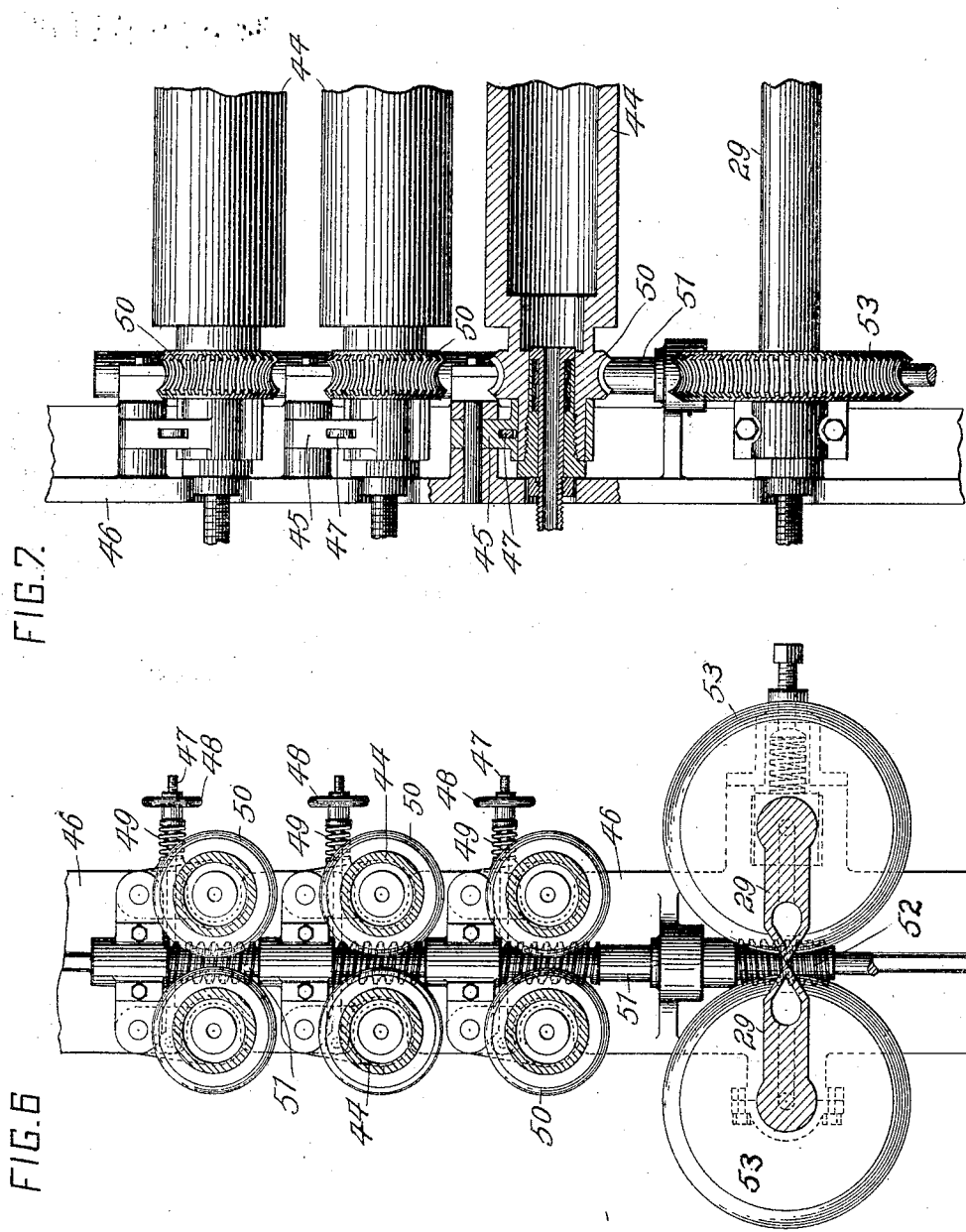

UNITED STATES PATENT OFFICE.

HALBERT K. HITCHCOCK, OF AKRON, OHIO, ASSIGNOR TO HIMSELF AND CHARLES W. BROWN, TRUSTEES, OF PITTSBURG, PENNSYLVANIA.

MANUFACTURE OF SHEET-GLASS.

No. 805,064.  Specification of Letters Patent.  Patented Nov. 21, 1905.

Application filed August 14, 1901. Serial No. 71,980. REISSUED

*To all whom it may concern:*

Be it known that I, HALBERT K. HITCHCOCK, a citizen of the United States, residing at Akron, in the county of Summit and State of Ohio, have invented or discovered certain new and useful Improvements in the Manufacture of Sheet-Glass, of which improvements the following is a specification.

The invention described herein relates to certain improvements in the method of manufacturing sheets or plates of glass direct—*i. e.*, without forming the glass into cylinders.

It has heretofore been attempted to form sheets by drawing the glass in sheet form from a furnace or other suitable receptacle. This method has been unsuccessful, for the reason that the pull effected a narrowing or reduction of transverse area in all directions, so that the sheet is rapidly reduced in width, fining down to a mere strand. It has also been attempted to form sheets by forcing the glass through a long narrow slot, but unsuccessfully, as the pressure of the glass as it emerges from the slot effected an upsetting or thickening of the glass in advance.

The object of the present invention is to provide for such a forced feed of the glass at the point where a shaping pull is exerted as to compensate for any reduction in width resulting from the shaping or dimensioning pull or draft. The invention is hereinafter more fully described and claimed.

In the accompanying drawings, forming a part of this specification, Figure 1 is a sectional elevation of a form of apparatus suitable for the practice of my invention. Fig. 2 is a vertical section on a plane indicated by the line II II, Fig. 1. Fig. 3 is an enlarged detail view of the lower portion of the pulling mechanism. Fig. 4 is a sectional plan view, the plane of section being indicated by the line IV IV, Fig. 1. Fig. 5 is a view similar to Fig. 1, illustrating a modified form of apparatus for the practice of the invention. Fig. 6 is an enlarged sectional elevation of the controlling-rollers and severing mechanism; and Fig. 7 is a view, partly in front elevation and partly in section, of the parts shown in Fig. 6.

In the practice of my invention the glass in a molten condition is caused to flow or exude from a suitable containing vessel or chamber 1 and preferably exude from a chamber or passage-way which has preferably a transverse length at the point of formation of the glass equal or approximately equal to the width of sheet to be produced. In order to render it certain that the glass shall be of the proper temperature as it exudes from the channel, it is preferred to provide suitable means whereby the glass may be heated or cooled as it flows along the channel or passageway. A convenient means to this end consists in embedding a number of rods 3 of suitable conducting material, as carbon, in the walls of the passage and connecting them in sets of two or more to a suitable electric generator, so that the temperature at any portion of the channel or passage-way may be increased or diminished by regulating the current. In case the glass is too hot as it flows from the receptacle it can be conveniently cooled by forcing a stream of air or other cooling fluid against a thin portion 4 of the wall of the passage. This thin portion is formed by recessing the wall of the passage, as shown. Except when a cooling down is required this recess should be filled with a piece of nonconducting material, as brick or tile $4^a$, to prevent loss of heat by radiation. As the glass exudes from the feed or shaping channel or slot it is subjected to a stretching or elongation, whereby it is brought to the desired thickness. If only the pull on the glass affected the exudation of the glass through the slot, the sheet produced would rapidly diminish in width; but by so regulating the forced feed and the pull on the sheet that they are equal the glass fed will always compensate for the tendency to reduction in transverse area due to the pull.

While any suitable mechanism known in the art may be employed for effecting the elongation and consequent transverse reduction of the glass, it is preferred to employ the mechanism shown. This mechanism consists of a pair of endless chains 5, passing over sprocket-wheels 6 and 7, the former being secured to a driven shaft 8, mounted in suitable bearings on the frame 9 and driven, through suitable interposed gearing, by a motor 10. The wheels 7 are carried by a shaft 11, supported in bearings on the frame 9 and so arranged with reference to the feed-slot that the upward-moving portions of the chains will be in a plane parallel with a vertical plane passing through the slot, as shown in Fig. 1. The chains are provided with a series of hooks 12 for engagement with the glass clamp or grip. It is preferred that the hooks should be yieldingly connected to the chains to prevent any sudden shock or strain to the glass when the grips are caused to engage the sheet. A convenient construction for this purpose consists of rods 13, secured to cross-pins 14 of the chains and serving as guides for the hooks, which are provided with eyes 15 for the reception of the rods. The hooks are supported by springs 16, surrounding rods, as shown in Fig. 3. The grip consists of a bar 17, provided with gripping-fingers 18 so constructed and mounted that by a partial rotation they will clamp the edges of the glass against the bar. The bar is provided outside of the fingers with wheels 19, loosely mounted thereon and adapted to move along suitable rails in the annealing-oven, as hereinafter described. A series of these grips is placed on inclined supporting-rails 20, which extend down to suitable proximity to the lower sprocket-wheels 7 or to the path of the hooks 12 as they are carried around the sprocket-wheels 7. Suitable stop mechanism is employed to insure the presentation of the grips one at a time to the hooks. This stop mechanism consists of levers 21, pivotally mounted on the rails outside of the paths of movement of the grips, but provided with lugs 22 and 23, projecting into the path of movements of the grips. These lugs are so arranged on the levers 21 that when the latter are supported in normal position by the springs 24, which bear at one end against the lever and at the opposite end against abutments 25 on the rods 26, secured to the rails 20, the lugs 23 will be slightly above the path of movement of the ends of the grips, while the lugs 22 will lie in such path of movement. The lugs are arranged a distance apart approximately equal to the distance between the ends of adjacent grips as they lie upon the supporting-rails 20. In order to allow one of the grips to drop down to position where it will be caught by one of the hooks 12, cams 27 (shown by dotted lines in Fig. 3) are secured upon the shaft 11 in such position that just before the hooks reach the points where they will engage one of the grips the cams will strike upon the levers 21 and depress them sufficiently to shift the stops 23 in front of one of the grips and the stops 22 from in front of the lowest grip, thereby permitting the lowest grip to drop down to proper position to be caught by the hooks. As the cams pass out of contact with the levers the latter are raised by the springs, so as to permit the grip retained by the stops 23 to drop down against the stops 22, where it will be held until another hook comes into proper position. As the grips are carried around by the hooks portions of the fingers 18 will lie outside of the edges of the sheet of glass being drawn until such portions reach the closing-stops 28, which are secured to the frame 9, as clearly shown in Fig. 3. By the engagement of these fingers with the closing-stops the fingers are turned down in front of the sheet, pressing the edges thereof against shoulders formed on the gripping-bar 17.

By the operation of the chains and gripping-bar the sheets are drawn to a suitable height, and provision is made for severing the sheet immediately above each bar after the preceding grip has reached a predetermined height dependent upon the length of sheet desired. A convenient mechanism for that purpose is clearly shown in Figs. 1, 2, and 4 and consists of blades 29, provided at their ends with trunnions 30, which are mounted in suitable bearings on the frame 9. These blades are arranged on opposite sides of the plane of movement of the sheet and are rotated so that their inner or cutting edges while operating to crack the sheet are moved in the same direction and at the same speed as the sheet. This rotation of the blades is effected by means of rack-bars 31, secured to the lifting-chains 5 in such relation to the hooks 12 that the blades will be brought around so that their inner edges will simultaneously contact with and bear upon opposite sides of the sheet in a line a short distance above the grip. This rack-bar intermeshes with a pinion 32, secured upon the trunnion of one of the blades and intermeshing with a corresponding pinion 33 of the trunnion of the other blade. It is preferable that the hooks and severing mechanism should be so located with relation to the travel of the sheets that the blades will operate upon the sheet just at the time that the preceding grip is beginning to pass around the upper sprocket-wheels 6, so that a slight bend or flexure will be given to the sheet, thereby facilitating its cracking off at the point or line of pressure of the blades.

The grips are carried around the sprocket-wheel 6, with the severed section suspended therefrom, and the rollers 19 on the grips are deposited upon the inclined rails 34, which extend into a suitable annealing-oven. The travel of the grips with the sheets through the annealing-oven is controlled by endless chains 35 passing around sprocket-wheels 36, one of which is driven through suitable interposed gearing by the motor 10. The chains are provided with projections 37, which extend down sufficiently to engage the grips and regulate their movement down the inclined rails.

The sides of the front end of the annealing-chamber are formed by plates 38, which extend between the chains 5 and are slotted for the movement of the projecting ends of the several grips. These side plates extend down to or a little beyond the severing mechanism, and the front of the annealing-chamber is closed by a movable door 39, which also extends down to a suitable support 40 in proximity to the severing mechanism. This construction will entirely protect the sheets as they are drawn up between the severing mechanism from drafts of air, which would be liable to effect an unequal cooling and consequent warping of the sheets.

In forming sheets with the apparatus described the glass in the furnace is maintained at such a level above the orifice of the channel or slot as to produce sufficient pressure to effect the desired flow or movement of the glass to such orifice or slot. The movement or flow produced by differences of level is preferred as giving more uniform results as regards the flow or exudation of the glass to the orifice or slot; but such flow could be effected by forcing the air or gas into the receptacle or chamber through a pipe $1^a$ containing the glass-supply.

In starting the apparatus the glass is forced out of the channel or slot to permit a suitable bait being attached thereto, so as to draw up by hand or otherwise a sufficient length of sheet to permit the grips to engage therewith. Thereafter the grips are caused to engage the edges of the sheet automatically and at suitable intervals in the manner described. While not necessary, it is preferred to arrange cooling-rollers 41 adjacent the point at which formation of the sheet begins and on opposite sides of the line of movement of the sheet. These rollers should bear against the sides of the sheet, so as to have a cooling and calendering effect thereon. It is preferred to support the rollers in such manner that their pressure would be due to and controlled entirely by the weight of the rollers themselves. To this end arms 42 are adjustably secured to suitable supports at opposite ends of the passage-way or channel in such manner as to serve as supports for the journals of the rollers 41. By changing the angle of these supporting-arms the rollers can be caused to bear with greater or less pressure against the sides of the sheet. If necessary, blast-pipes 43, having their discharge-openings arranged to cause the air to impinge upon the glass, can be arranged in such relation to the slot as to cool the glass as it flows therefrom.

As shown in Figs. 5, 6, and 7, gravity may be employed for effecting the stretching and consequent thinning of the sheets or shaping of other articles. As shown in Fig. 5, the channel or passage-way is so formed that the flow of glass through the channel is effected by or is due to the controlled action of gravity. As the sheet elongates it passes down between a series of pairs of rollers 44, mounted in suitable bearings on opposite sides of the path of movement of the sheet. These rollers bear lightly upon the surfaces of the sheet and are rotated in such manner as to control the downward movement of the sheet and regulate the pull on the glass as it flows from channel or passage-way, thereby counterbalancing the increasing weight of the sheet as it is formed and maintaining a uniform pull on the glass as it is forced through the channel. In order to regulate the pressure of these rollers on the sheet, their bearings are formed at the ends of the arms 45, pivotally mounted upon the side frames 46. Rods 47 are passed through slots in one of each of the pairs of the arms and are connected to the opposite arm of the pairs. Said arms are drawn toward each other to increase the pressure of the rollers of the sheets by means of hand-wheels 48, screwing onto the ends of the rods and bearing, through the medium of springs 49, against one of the arms. The pivots are so arranged that when hanging freely the rollers will barely contact with the sides or surfaces of the sheet. On the journals, at one end of these rollers, are secured worm-wheels 50, which intermesh with worms on the shaft 51. This shaft is driven by a suitably-arranged motor. The severing mechanism, which is arranged below the regulating-rollers, is similar to that described in connection with the construction shown in Fig. 1 and consists of blades 29, rotatively mounted and driven at the same rate of speed as the feed of the glass by a worm 52 on the shaft engaging worm-wheels 53 on the trunnions of the blades. One of the blades is adjustably mounted, so that it can be moved toward and from the other, according to the thickness of glass operated. This adjustment, however, will not be sufficient to shift worm-wheel 53 out of engagement with the worm 52.

A desirable mechanism for receiving the sheet as it is severed by the blades consists of a series of fingers 54, carried by sprocket-chains $55^a$, which pass through the annealing-oven. These fingers are supported or braced in receiving position by arms 55, extending down to the sprocket-chain. On the fingers are mounted blocks 56, yieldingly supported by springs 57, surrounding the fingers. The sprocket-chains 55 are so moved with relation to the rate of formation of the sheet that the blocks 56 will be brought immediately under the lower end of the sheet just at the time that the blades operate on the sheet, so that by the continued forward movement of the fingers a slight flexure of the sheet is effected to facilitate or complete the cracking off of the sheet. After being cracked the sheet will rest in an inclined position upon the fingers and will be carried through the annealing-oven. The front end of the annealing-oven is closed by a metal shell 58, having a slot for the entrance of the sheet to prevent any unequal cooling of the sheets.

It is characteristic of the method heretofore attempted—*i. e.*, pulling the sheet from a body of molten glass—that the narrowing occurs closely adjacent to the molten body or point of greatest plasticity of the sheet; but by feeding the glass to the point where the pull or elongation occurs, so that there will be a constant and uniform supply, and by cooling the glass as the elongation occurs all narrowing of the sheet is avoided. It is preferred that sufficient quantity of glass should be forced out to form a body outside of the slot somewhat wider and thicker than the corresponding dimensions of the sheet to be formed, so that the glass will have opportunity to lose somewhat of its plasticity through the cooling action of the air-jets. The rollers 41 are located so as to contact with the sheet just as it reaches the desired thickness, and as the rollers are cooled by the circulation of fluid therethrough the sheet will be hardened to such an extent that no further change in its dimensions will be effected.

When using the apparatus shown in Fig. 5, the glass is forced out of the slot in a sheet having nearly the thickness and width required, and provision is made for chilling the glass as it exudes from the slot by jets of air from the blast-nozzles 59. It will be understood that in beginning the operation a perfect sheet will not be formed until sufficient weight of glass has flowed out to exert the required pull on the glass as it comes from the slot. As soon as sufficient weight of glass has passed out the rollers 44 are adjusted against the sheet, so as to maintain a uniform tension on the glass as it exudes from the slot. These rollers may be made to bear only lightly on the glass and be rotated in the direction opposite the movement of the glass or they may be caused to grip the sheet and be rotated in the direction of the movement of the sheet.

It is characteristic of my improvement that the glass as forced from the slot is subjected to a regulated tension, so as to carry the glass away as or nearly as it is forced through the slot. In one case the tension is produced by mechanism operating to overcome the force of gravity and in the other case gravity controlled or regulated affects the tension or pull on the glass.

I claim herein as my invention—

1. In an apparatus for forming sheets of glass, the combination of a receptacle for the glass having a discharge slot or opening, means for forcing the glass through said slot or opening, means for applying a regulated tension to the glass whereby the glass is pulled away from the slot at or approximately at the rate of feed through the slot and means for severing the glass beyond the line or point at which tension is applied, substantially as set forth.

2. In an apparatus for forming sheets of glass, the combination of a receptacle for the glass having a discharge slot or opening, means for forcing the glass through said slot or opening, means for regulating the temperature of the glass as it flows through the slot or opening, means for applying a regulated tension to the glass, whereby the glass is pulled away from the slot at or approximately at the rate of feed and means for severing the glass beyond the line or point at which tension is applied through the slot, substantially as set forth.

3. In an apparatus for forming sheets of glass, the combination of a receptacle for the glass having a discharge slot or opening, means for forcing the glass through said slot or opening, a mechanism arranged in a plane parallel or approximately parallel with the direction of feed of the glass through the slot adapted to pull the glass away from the slot at or approximately at the rate of feed of glass through the slot and means for severing the glass beyond the line or point at which tension is applied, substantially as set forth.

4. In an apparatus for forming sheets of glass, the combination of a receptacle for the glass having a discharge slot or opening, means for forcing the glass through said slot or opening, a pulling mechanism arranged in the plane of feed of the glass through said slot or opening, and a series of grippers for connecting the glass sheet or plate to the pulling mechanism, substantially as set forth.

5. In an apparatus for forming sheets of glass, the combination of a receptacle for the glass having a discharge slot or opening, means for forcing the glass through said slot or opening, means for applying a regulated tension to the glass whereby it is pulled away from the slot at or approximately at the rate of feed through the slot and means operated by the tension mechanism for cracking the glass at predetermined points or intervals, substantially as set forth.

6. In an apparatus for forming sheets of glass, the combination of a receptacle for the glass having a discharge slot or opening, means for forcing the glass through said slot or opening, a pulling mechanism arranged in a plane parallel to the direction of feed of glass through the slot, rotatable blades operated by the pulling mechanism for cracking the glass arranged to operate at predetermined intervals, substantially as set forth.

7. In an apparatus for forming sheets of glass, the combination of a receptacle for the glass having a discharge slot or opening, means for forcing the glass through said slot or opening, a pulling mechanism arranged in the plane of feed of glass through the slot, a series of grippers detachably connected to the pulling mechanism and mechanism for feeding the grippers to the pulling mechanism one at a time, substantially as set forth.

8. The combination of a glass-containing chamber or receptacle, an orifice having a shape substantially similar to that of the article to be formed, located outside of the chamber but connected thereto, means for causing a flow of glass from the chamber to a formative point in said orifice, means for applying continuously a stretching tension to the glass in such manner as to remove the glass from the orifice at a rate equal to the movement of the glass thereto and means for cooling the glass from the formative point outwardly or in the direction of pull, substantially as set forth.

9. The combination of means for bringing a mass of glass to a shape similar to that of the desired product, means for cooling the glass at the point at which it assumes the desired shape and means for applying tension to such initial shape for reducing the shape to the desired dimensions without material alteration of the shape in transverse section, at a rate equal or approximately equal to the rate of initial formation.

10. The combination of a glass-containing chamber or receptacle, an orifice having a shape similar to that of the article desired connected to the chamber, means for causing a flow of glass to the orifice, a heated chamber and means adapted to pull the glass from the orifice at a rate equal or approximately equal to the flow of glass to the orifice and deliver the sheet while hot into the heated chamber, substantially as set forth.

11. The combination of a glass-containing chamber or receptacle, an orifice having a shape similar to that of the article desired connected to the chamber, means for causing a flow of glass to the orifice, a heated chamber above the orifice and means adapted to pull the glass from the orifice and deliver it into the heated chamber, substantially as set forth.

12. The combination of a glass-containing chamber or receptacle, an orifice or opening having a shape similar to that of the article desired, means for causing a flow of glass to the orifice or opening, a heated chamber, means for pulling the glass from the orifice or opening and delivering it into the heated chamber and means for severing the glass into lengths or sections, substantially as set forth.

13. The combination of a glass-containing chamber or receptacle, an orifice or opening having a shape similar to that of the article desired, means for causing a flow of glass to the orifice or opening, a heated chamber above the orifice, means for pulling the glass from the orifice or opening and delivering it into the heated chamber and means for severing the glass into lengths or sections, substantially as set forth.

14. The combination of a glass-containing chamber or receptacle, a slot or orifice connected to the chamber, means for positively forcing molten glass up through such slot or orifice, means for cooling the surface of such glass to the line of contact with such slot or orifice, means operative to stretch such glass as it emerges from such slot or orifice, substantially as set forth.

15. The combination of a glass-containing chamber, a slot or orifice connected to the chamber, means for positively forcing molten glass through such slot or orifice, means for cooling the surface of the glass as it passes out of such slot or orifice to the line of contact on such slot or orifice, a heated chamber, means operative to stretch such glass as it emerges from such slot or orifice and deposit it in a heated chamber, substantially as set forth.

16. The combination of a receptacle for molten glass having a discharge-orifice connected therewith, means for forcing the glass to such orifice, means for regulating the temperature of the glass as it passes to such orifice, means for cooling said glass as it leaves said orifice and a pulling apparatus for taking the glass away as fast as it is fed to such apparatus, substantially as set forth.

17. In an apparatus for the formation of sheets of glass the combination of a receptacle for holding molten glass, a discharge slot or opening connected therewith of a shape similar to the finished article, means for forcing the molten glass to a formative point at or near the end of said slot or opening, a heated chamber, means for applying a regulated tension upon the glass and moving it into the chamber whereby the glass is pulled away at or approximately at the same speed as the movement of the glass to such formative point, substantially as set forth.

18. The combination of a receptacle for molten glass having a discharge slot or opening connected therewith, means for forcing the glass to a formative point at or near the end of said opening, means for regulating the temperature of the glass in its passage to such formative point, means for applying a regulated tension to the glass whereby it is pulled away at a rate equal or approximately equal to the rate of feed to such formative point and a means for cooling the surface of said glass under tension to the line of contact with the retaining-walls at such formative point, substantially as set forth.

19. In an apparatus for forming sheets of glass, the combination of a receptacle for the glass, an upwardly-discharging slot or opening outside of the receptacle but connected therewith, means for forcing the glass through said slot or opening, means for applying a regulated tension to the glass whereby the glass is pulled away from the slot at or approximately at the rate of feed through the slot and means for severing the glass beyond the line or point at which tension is applied, substantially as set forth.

20. In an apparatus for forming sheets of glass, the combination of a receptacle for the glass, an upwardly-discharging slot or opening outside of the receptacle but connected therewith, means for forcing the glass through said slot or opening, means for regulating the tension on the glass as it flows through the slot or opening, means for applying a regulated tension to the glass whereby the glass is pulled away from the slot at or approximately at the rate of feed thereto, and means for severing the glass beyond the line or point at which tension is applied thereto, substantially as set forth.

21. In an apparatus for forming sheets of glass the combination of a receptacle for the glass, an upwardly-discharging slot or opening outside of the receptacle but connected therewith, a mechanism arranged in a plane parallel or approximately parallel with the direction of feed of glass through the slot, adapted to pull the glass away from the slot at or approximately at the rate of feed through the slot and means for severing the glass beyond the line or point at which tension is applied, substantially as set forth.

In testimony whereof I have hereunto set my hand.

HALBERT K. HITCHCOCK.

Witnesses:
　DARWIN S. WOLCOTT,
　F. E. GAITHER.